Oct. 18, 1960     W. H. EARHART     2,956,373
GLASS BULB FABRICATION
Filed April 30, 1957     2 Sheets-Sheet 1
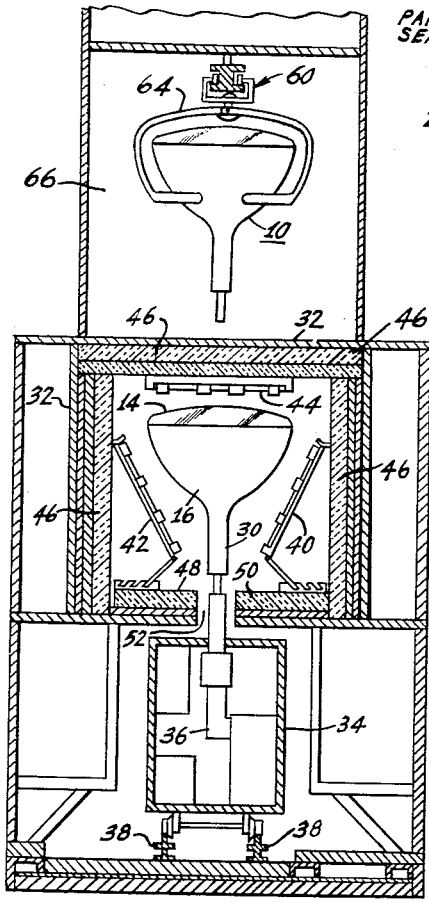
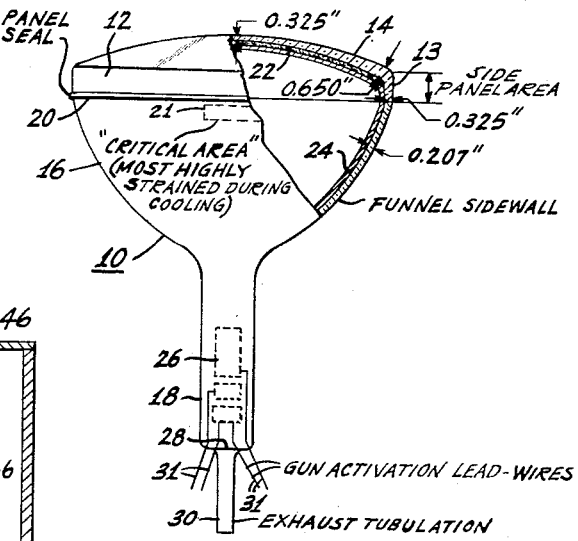
Fig. 1.
Fig. 3.     Fig. 4.
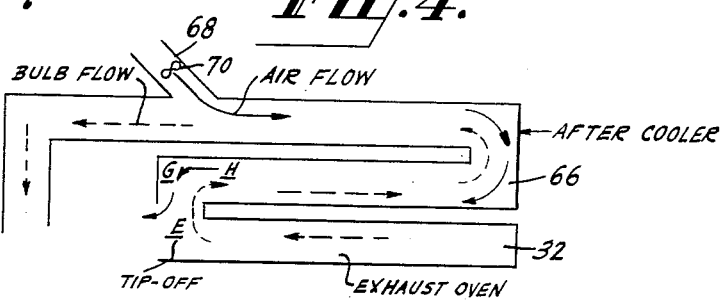
INVENTOR.
WILLIAM H. EARHART
BY
William A. Zalesak
ATTORNEY

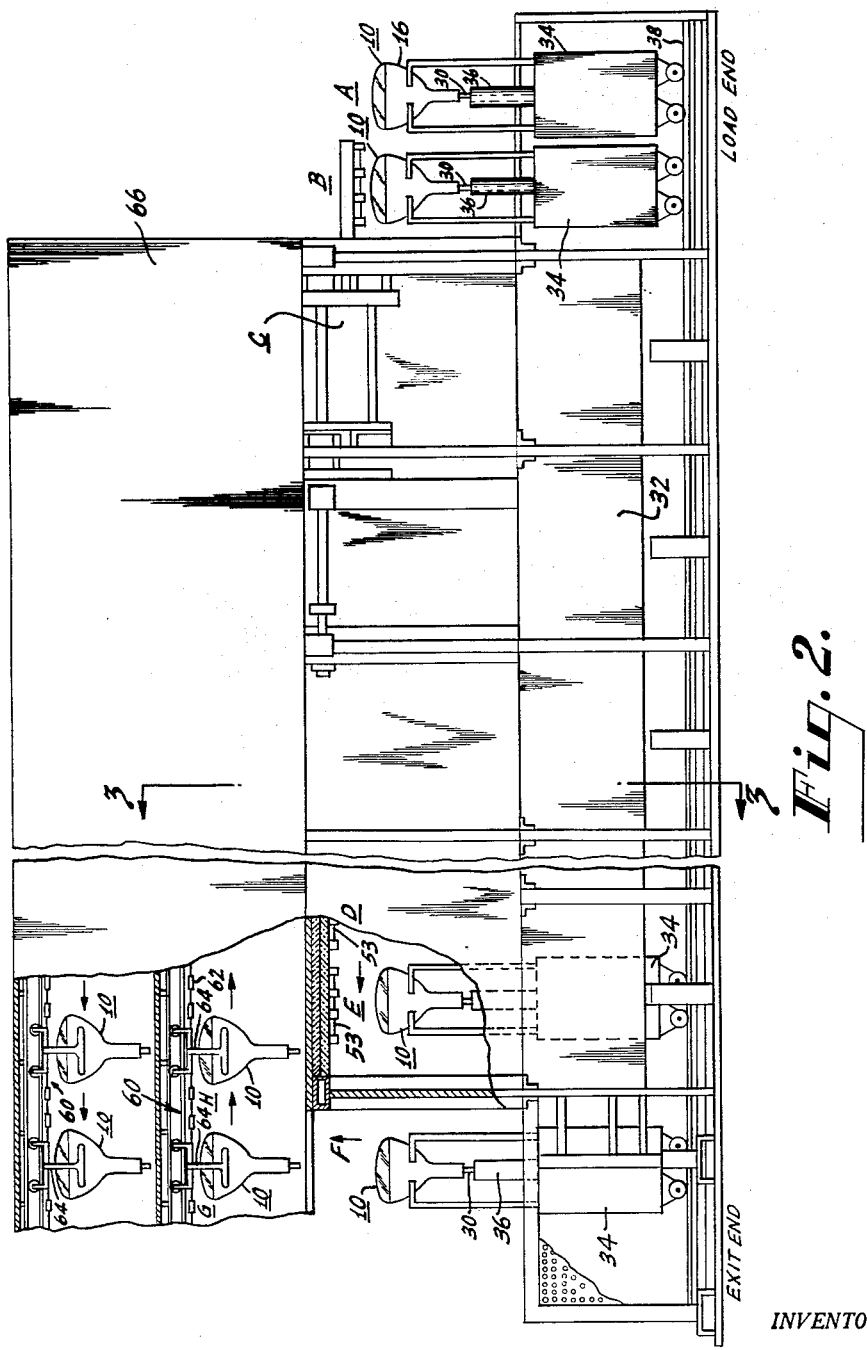

United States Patent Office 2,956,373
Patented Oct. 18, 1960

2,956,373

GLASS BULB FABRICATION

William H. Earhart, Marion, Ind., assignor to Radio Corporation of America, a corporation of Delaware Filed Apr. 30, 1957, Ser. No. 656,124

6 Claims. (Cl. 49—89)

This invention is directed to the art of fabricating a cathode ray tube and particularly related to that part of the tube processing wherein the glass bulb cathode ray tube is simultaneously evacuated while being heated to high temperatures.

A cathode ray tube includes a glass envelope which is assembled from a face plate portion consisting of a cap of relatively thick glass and a glass funnel having relatively thin side walls. The cap and funnel are sealed together to form an enclosed bulb. Extending from the small end of the funnel is a tubular neck portion, into which is sealed an electron gun. A normal fabrication procedure for such a tube envelope is one in which the assembled bulb has deposited on the inner surface of the face plate a phosphor screen, which in turn is coated with a thin lacquer film, upon which is deposited an evaporated film of aluminum metal. The inner wall of the funnel is covered with a conductive coating. An electron gun mount, including an exhaust tubulation, is sealed into the open end of the tubular neck portion. The assembled tube is placed in an exhaust machine for final bakeout and degassing of the tube elements during a simultaneous exhausting of the tube.

The exhaust machine for the tube consists of a long oven. The tube is mounted on an exhaust cart having an individual exhaust system and electrode connections for final tube processing. The exhaust cart, with the tube, is sent through the oven, where the tube is raised to a temperature not greater than 420° C. and where its temperature above 400° C. is maintained for at least 12 to 15 minutes. In the exhaust machine after bakeout and degassing operation, the tube then is cooled down slowly to around 210° C. and exposed to room temperatures for a few minutes, while the exhaust tubulation is sealed off. Then the tube passes into an after-cooler, where the tube is allowed to cool down slowly to substantially 100° C.

One of the production problems, heretofore encountered, has been that occasionally the tube implodes when it reaches the exit of the exhaust line and moves into the colder ambient air temperature of the seal-off position. The reason for this is that, as the tube cools in the latter half of the exhaust line, the glass in the face plate panel and the funnel side wall cools and contracts unequally, thus setting up very high temporary strains in the glass. It is easily appreciated that the thin glass in the funnel of the tube will cool more quickly than the glass in the face plate which is around three times as thick. Consequently, the glass is under high thermal strain as the tube moves into the seal-off position. The much cooler air in this position causes the strain in the glass to rapidly go even higher so that spontaneous implosion of the tube may occur, if the strain becomes excessive and a suitable flaw is present in the glass to initiate failure.

It is thus an object of the invention to provide a novel method of tube fabrication wherein breakage of heated glass parts is minimized during cooling.

It is another object of the invention to provide a method of tube fabrication involving high temperatures whereby glass portions of the tube or bulb are able to withstand differentials of expansion upon cooling.

It is a further object of the invention to provide a novel technique in the fabrication of glass cathode ray tubes or bulbs to minimize breakage when heated tubes or bulbs re exposed to cooling conditions.

The invention is in a heat treatment of the tube or bulb at a certain stage in its fabrication cycle, wherein the distribution of strains in the glass of the tube or bulb is controlled by a selective application of heat to a localized area of the tube or bulb so that breakage of the glass, when exposed to cooling conditions is minimized.

Specifically, in the fabrication of cathode ray tubes of the type described, during the cooling period of the tube in the exhaust oven, the face plate of the tube alone is exposed to a high temperature treatment in order to change the strain pattern toward a compressional strain pattern to enable the tube to stand thermal shock better, as the heated tube emerges into the relatively cool atmosphere at the tip-off position. Before the tube leaves the relatively high temperatures of the exhaust oven, a special overhead heater is used to heat only the face plate of the tube to a higher temperature than it would otherwise have. This treatment changes the strain pattern in the critical region of the tube toward compression to compensate for tensional strains set up as the tube enters room atmosphere at the tip-off position.

Figure 1 is an elevational view partially in section of a cathode ray tube of the type described in this application.

Figure 2 is an elevational view partly in section of a portion of a cathode ray tube exhaust machine.

Figure 3 is an enlarged sectional view of the exhaust machine of Figure 2 and in accordance with section line 3—3, of Figure 2.

Figure 4 is a schematic drawing showing the operation of the exhaust machine of Figures 2 and 3.

Figure 1 discloses a cathode ray tube bulb 10 formed of glass. Bulb 10 consists of a cap portion 12, which includes a glass face plate 14 closing the large end of bulb 10. Forming the other portion of the bulb is a funnel portion 16 having sealed to its smaller end a glass tubular neck 18. The normal fabrication of a glass bulb, of the type shown in Figures 1 and 2, is that in which a cap portion 12 is molded by conventional glass molding techniques into the configuration shown in Figure 1. The bulb funnel portion 16 is either blown or spun into the funnel shape in Figure 1. The funnel 16 is sealed at the periphery of its larger end to the edge of the face plate cap 12. The seal area is indicated at 20. The glass tubular portion 18 is then sealed to the small end of funnel 16 to complete the glass bulb. This glass bulb 10 constitutes the tube envelope, which during tube fabrication is evacuated and sealed.

In a bulb of the type described, having a face plate diagonal in the order of 24 inches, the cap portion has varying thicknesses of glass at different portions. In the center of the face plate, for example, the glass is substantially 0.325 inch, while at the periphery of the face plate and in the corners of the cap 12, the glass is considerably thicker and may vary from 0.500 inch to 0.650 inch. An intermediate portion, 13 called the side panel, is tapered from the thick glass of the face plate 14 to the thin glass of the funnel side walls, resulting in a glass thickness at the edge of the side panel 13 in the region of seal 20, varying from 0.300 inch to 0.335 inch, for example. The funnel portion 16 of the glass bulb adjacent to the seal area 20 has a varying thickness with a minimum thickness in the centers of the side walls. In these areas the glass is in the order of 0.207 inch, and only increases slightly around the periphery of the end of the funnel portion 16 at the seal 20. Thus, the face plate cap portion is considerably more massive than the adjacent areas of the funnel portion 16 with the glass at the corners of the cap portion being relatively heavy. This design of glass cathode ray tube bulb is that which has provided advantageous for television picture tubes, and is one which gives great strength with a minimum amount of glass. Figure 1 shows the dimensional thicknesses of the bulb glass in certain areas for one type of bulb used in a television picture tube.

In the normal fabrication of the glass bulb assembly into a functional cathode ray tube, a phosphor screen 22 and a conductive coating 24 are formed on respective inner surfaces of the tube envelope. An electron gun structure 26 is mounted on a glass stem 28, which in turn is sealed to the open end of tubular neck portion 18 to close the envelope. Stem 28 includes an exhaust tubulation 30, which is used for evacuating the tube envelope during the bake-out and exhaust procedure. Conductive leads 31 are sealed through stem 28 and connected to respective electrodes of gun 26 to provide processing voltages thereto.

After sealing-in the electron gun 26, the tube is taken to an exhaust machine for final bake-out and degassing. Figures 2 and 3 show views of the exhaust machine, which consists substantially of a long oven and cooling tunnel 32, known as an exhaust machine. Here final bake-out and degassing of the elements inside the tube takes place under tube evacuation. First, the tube is mounted neck-down on a small 4-wheeled cart 34, with the exhaust tubulation 30 hermetically connected to an exhaust pump system 36. Tube leads 31 are fastened to respective terminals (not shown), on the cart so as to connect the several electrodes of gun 26 to appropriate voltages during tube bake-out and processing. A pair of rails 38 form a track, along which the cart may roll, as it is indexed from station to station in the exhaust machine.

The tube 10 is loaded onto a cart 34 at a position A (Figure 2). As the machine indexes, cart 34 is driven by a chain drive (not shown) to which it is connected, to a second position B in front of doors closing the oven 32. The next index automatically opens the doors of the oven and the loaded cart is moved from position B into a first position C within the oven 32. In this position C, the tube is exposed to electric heater units 40, 42 and 44 (Figure 3) which radiate an intense heat onto the walls of the tube bulb 10. Heater units 40 and 42 are disposed at the sides of the oven and direct heat onto the thin side walls of the bulb, while heater unit 44 directs heat onto the face plate of the tube. As shown in Fig. 3, the walls of the oven 32 are formed with sides and top of several thicknesses of refractory insulating material 46. The bottom of the oven 32 consists of two sections 48 and 50, also of insulating material. These sections, however, are spaced apart to form a free path 52 to allow passage of the upper portion of exhaust pump system 36 as it is carried through the oven by its respective cart 34. While in the oven 32, a bulb is indexed through thirty-two stations or positions. In the first position C of the exhaust oven, the roughing pump of exhaust pump system 36 starts to evacuate the bulb.

The heater units, 40, 42 and 44 extend through the oven 32 for the first seventeen positions. In this part of the exhaust machine normal bake-out and degassing of the tube occurs. During the first seven positions the tube is heated from a relatively low temperature at which it enters the oven to a relatively high temperature not above 420° C., for the type of tube described. The heaters in the next ten positions of the oven maintain the temperature of the glass bulb in the neighborhood of 405° C., so that the tube itself and the structures enclosed in the tube are baked at a temperature of over 400° C. for a period of from 12 to 15 minutes. Throughout positions eighteen through thirty-two in the oven, there are normally no heating elements provided, and during this time, the bulb is allowed to cool down from its high temperature of over 400° C. to a temperature in the neighborhood of 210° C., depending upon the size of the bulb. Because of the closed nature of the oven, in this cooling section, it is possible to control the cooling and allow the bulb to gradually lose its heat. During the travel of the tube 10 through the length of the oven, the exhaust system maintains the tube envelope evacuated. From the last or thirty-second position (shown in Figure 2 as position E) the bulb passes out of the other end of the oven and into position F which is exposed to the room atmosphere. In this position F, the exhaust tubulation 30 is sealed close to stem 28, to leave the tube permanently evacuated and to separate the tube from the exhaust pump 36.

After the exhaust tubulation 30 is sealed, the tube is lifted upwardly by a transfer mechanism (not shown) and in position G transferred to a conveyor system 60 consisting of an endless chain belt 62 having spaced carriers 64 for supporting the tubes 10 as they are moved along the track of system 60. From the position G the conveyor 60 moves each tube in a continuous motion through a position H and through an after-cooler section 66, in which the tube is cooled under controlled conditions from a temperature of around 200° C. to 100° C. Figure 4 schematically shows the relationship of the after-cooler 66 and the exhaust oven 32. A continuous air flow is passed through the after-cooler 66 in the direction indicated by the solid arrows. Air is introduced into the after-cooler 66 through a duct 68 by means of a fan mechanism 70. The direction of movement of the continuous belt 60 with the tubes 10 is shown by the dotted arrows in Figure 4.

The above description of tube fabrication is one which is used in mass production of cathode ray tubes for television purposes. These tubes are of relatively large size, having a rectangular face plate with a diagonal which may vary from 17 inches to 24 inches, depending upon the size of tube.

It was found that the outer surface of the glass tubes 10, as they pass through oven 32 and during their slow cooling before they reach position E, possessed a temporary strain or stress pattern, in which areas on the surface of the glass tube are under tensional stress. This is a result of the cooling rate of the more massive face plate glass being slower than the cooling rate of the relatively thin side walls of funnel portion. It was also found that, there is a critical area on the tube surface, in which cracks originate resulting in breakage and implosion of the evacuated tube sooner or later. The critical area of a tube of the type described, is that area in the outer surface of the glass tube and where the surface of the glass is under highest tensional stress. On rectangular tubes of the type shown in Figure 1, this critical area is of the highest tensional stress was located in an area 21 (see Figure 1) in the side wall of the funnel portion within one inch of the seal area 20 and at the center of the long sides of the bulb. It was further discovered that the temporary strain set up in oven 32 and which is one due to tensional stresses in this critical area in the tube, remains during the slow cooling of the tube between positions 20 and 34 of oven 32. The tensional stress and strain in the critical area increase during this cooling period, as the face plate temperature approaches tube side wall temperature. Then, the sudden exposure of the tube to the relatively cool ambient room temperature at position F and to the air flow of the after-cooler in positions E and H, further increases the temporary strain in the critical area of the tube. Because of these conditions, excessive breakage takes place in positions E through H and beyond in the after-cooler.

Glass under tensional stress is weaker than glass under compressional stress. Tubes, such as those described above and shown in Figures 1 and 2, decrease in mechanical strength and thermal shock resistance when under high tensional stress. According to the invention, steps are taken to relieve the tensional stress pattern of a glass tube in the critical area, as the bulb passes from position E, through position F into the after-cooler. Therefore, in accordance with the invention, the face plate 14 of the glass tube alone is heated in the positions D and E (Figure 2), prior to passing out of the oven into tip-off position F. By re-heating the face plate in this manner, in positions D and E, the glass strain due to tensional stresses in the critical area is reduced.

The invention is carried out by the use of over-head heater units 53, positioned above the face plate of the tube, in both positions D and E. Each unit may carry 17 amperes at 220 volts, for example. The normal index of the exhaust machine described, is 65 seconds. Thus, the face plate of the tube, in positions D and E is exposed to radiant heat of unit 53 for a period of time equal to two indexings of the machine. This is sufficient to raise the temperature of the face plate to a temperature between 200° C. and 400° C. or approximately 100° C. more than the face plate temperature would otherwise have been without the use of the heaters. This causes the face plate 14 of the tube to expand faster than the cooler side walls of the funnel portion, and thus, reduces the tensional stress on the tube surface in the critical area toward compression. This reduces the tensional strain in the critical area and greatly increases the thermal shock-resistance of the tube, so that it can withstand, to a greater degree, the thermal shock as the tube passes into the relatively cool area of position F.

The amount of strain in the critical area of the tube can be measured in millimicrons, which is the change in the wavelength of light, when the tube is viewed in reflected, polarized light with a polarimeter, as the tube changes temperature from an equilibrium condition such as room temperature. Normally, as the tubes approach the position D in oven 32, the tensional strain in the critical area of each tube will average around 360 millimicrons. This tensional strain is excessive, as tubes with 345 millimicrons amount of tensional strain in the critical area are likely to implode or to crack. The implosion may take place in the oven 32, in the tip-off position F, or anywhere in the aftercooler 66, since in these positions the tensional strain in the critical area will go considerably higher than the 360 millimicrons. Oftentimes, the breakage amounts to merely the formation of a small crack in the critical area, which slowly gives way and results in tube implosion later during subsequent processing or storage of the tube. By heating the face plate to higher temperatures in positions D and E of the exhaust oven, the tensional strain in the critical area is reduced to around 245 millimicrons, as the tube moves out of the oven into position F.

The face plate of the tube cools down from the temperature to which it was raised in positions D and E, as the tube moves through positions F, G, and H into the after-cooler. This cooling of the face plate again causes the tensional strain to increase in the critical area of the tube. However, because of the faceplate heating in positions D and E of oven 32, the tensional strain in the critical area increasts only by an amount of approximately 30 to 50 millimicrons resulting in a total tensional strain of approximately 275 to 300 millimicrons in the critical area as the tube moves through positions G and H. This is still below the tensional strain at which the tubes are likely to crack or implode. However, these values of tensional strain in the critical region of the bulb are still considerably above the 180 millimicrons tensional strain, which is recognized as the safe limit for tubes sold commercially. Fortunately, the tensional strains which are being considered here are temporary, and while they are high, they disappear when the tube cools to final ambient temperature.

This heating of the face plate is described as being undertaken at the positions D and E of the exhaust oven. However, with preferential face plate heating, it has been proven that, the greater the differential in temperature between the face plate 14 of the tube and funnel portion 16, the less will be the tensional strain in the critical area. Accordingly, if the index of the machine were slower, the face plate could be heated to a higher temperature than for the time described above, or, it is within the scope of the invention to utilize additional heater units in one or more positions before position D in the exhaust oven. The change of the tensional strain in the critical area is roughly proportional to the temperature differential between the face plate and the funnel portion 16 of the tube. Thus, heating the face plate to a less amount, than that described, will not result in carrying the strain pattern toward compression to the same degree. It is thus within the scope of the invention to provide sufficient heat to the face plate before the tube enters the tip-off position F to reduce the tensional strain pattern in the critical area a maximum amount for the conditions of tube fabrication.

The control of the glass strain pattern in the critical area of the tube is a selective application of heat to a localized area of the tube specifically the face plate of television tubes, and is in contrast to previous attempts to maintain all parts of the tube at the same temperature during the cooling cycle. This novel control of the glass strain pattern of the tube results in a decided decrease in breakage of glass tubes, with the mass production procedures described above.

The strain patterns set up by the various fabrication steps in the bake-out lehr and the exhaust oven, are merely temporary and remain with the tube during the times it is exposed to heating and cooling temperatures. Thus, in accordance with the invention, there is a distinct advantage in controlling the strain patterns by modifying them in a direction which results in a minimum of breakage. The strain patterns set up in the tube, although roughly proportional to the temperature differential between the face plate portion of the tube and the glass funnel portion, appear to be more a result of the physical movement or expansion of the face plate relative to the side walls of the funnel. Control of the strain pattern by heating the face plate before the tube leaves the exhaust oven clearly reduces the implosion rate of evacuated tubes, as described, and with an increasing savings of materials and time.

It is recognized that glass in itself is not normally made more thermal shock resistant by heating to higher temperatures. However, the functioning of this invention depends on heating a strong, thick section of the glass tube (face plate) in order to lower the tensional strain in a weak, thin, sidewall section where failure (cracking and implosion) starts. The advantage of controlling the strain pattern of the tube as it leaves the exhaust machine does not necessitate slowing the machine down to a point where the controlled cooling of the tube before position E will reduce the tensional strain in the critical area. Thus, it is unnecessary, in accordance with the invention, to provide uniform cooling to the extent necessary, if the face plate was not heated in positions D and E.

As set forth above, the invention is that in which the strain pattern is modified by a selective application of heat to a localized, strong area in order to control the strain pattern in weak or critical areas of the bulb. The invention sets up a more desirable strain pattern than that which is established by the usual, controlled cooling. Furthermore, the invention involves a positive formation of an advantageous strain pattern as distinguished from an attempt to eliminate all strain pattern by uniform cooling of all parts of the tube simultaneously. By thus controlling the strain pattern, the tube is better able to withstand thermal shock during its processing.

What is claimed is:

1. The method of processing an evacuated cathode ray tube having a relatively thick glass face plate portion and an adjacent thinner funnel portion, said method consisting of baking said tube at a given temperature, cooling said tube from said given temperature, wherein said baking and cooling establish a tensional stress pattern in a critical area of said funnel portion, heating only the face plate of the tube to increase the temperature differential between said face plate portion and said funnel portion for changing the surface stress pattern of the funnel portion from one of tension toward a compressional pattern, and then further cooling said tube.

2. The method of processing an evacuated cathode ray tube having a relatively thick glass face plate and an adjacent thinner funnel portion, said method consisting of the steps of, baking said tube at a temperature above 400° C., cooling said tube more than 100° C. from said baking temperature, wherein said baking and cooling establish a tensional stress pattern in a critical area of said funnel portion, heating only the face plate of said tube toward the end of said cooling step to raise said face plate temperature in the order of 100° C. to increase the temperature differential between said face plate and said funnel portion and thereby to change the tensional stress pattern in said critical area toward a compressional stress pattern, and then further cooling said tube.

3. The method of processing an evacuated cathode ray tube having a relatively thick glass face plate and an adjacent thinner funnel portion, said method consisting of the steps of, baking said tube at a temperature above 400° C., cooling said tube more than 100° C. from said baking temperature, wherein said baking and cooling establish a tensional stress pattern in a critical area of said funnel portion, heating only the face plate of said tube at the end of said cooling step to raise the temperature of said face plate and to increase the temperature differential between said face plate and said funnel portion and thereby to change the tensional stress pattern in said critical area toward a compressional stress pattern, and exposing said bulb to further cooling.

4. The method of processing an evacuated glass cathode ray tube having a relatively thick glass face plate portion and a thinner walled glass funnel portion, said method comprising the steps of, baking said tube at a temperature between 400° C. and 425° C. for a period of time to permit said tube portions to reach said temperature, cooling said tube from said baking temperature, reheating said face plate to a temperature between 200° C. and 400° C. while continuing the cooling of said funnel portion, and further subsequently cooling said tube portions to ambient temperature.

5. The method of processing a glass cathode ray tube having a relatively thick glass face plate portion and a thinner walled glass funnel portion and wherein all portions of said tube are at a baking temperature above 400° C. and said tube is evacuated, said method comprising the steps of slowly cooling said tube down to a temperature in the neighborhood of 210° C., heating said face plate to a temperature not greater than 400° C. to increase the temperature differential between said face plate and said funnel portions to change the stress pattern in the glass of said funnel toward a compressional stress pattern, and further cooling all parts of said tube to ambient temperature.

6. The method of processing a glass cathode ray tube having a relatively thick glass face plate portion and a thinner walled glass funnel portion and wherein all portions of said tube are at a baking temperature above 400° C. and said tube is evacuated, said method comprising the steps of slowly cooling said tube down to a temperature in the neighborhood of 210° C., heating said face plate to a temperature in the order of 100° C. above that of said funnel portion to increase the temperature differential between said face plate and said funnel portions to change the temporary stress pattern in the glass of said funnel portion toward a compressional stress pattern, and further cooling all parts of said tube to ambient temperature.

References Cited in the file of this patent

UNITED STATES PATENTS

| | | |
|---|---|---|
| 2,009,748 | Sherwood | July 30, 1935 |
| 2,198,734 | Littleton | Apr. 30, 1940 |
| 2,259,165 | Karasick | Oct. 14, 1941 |
| 2,754,628 | Dawe | July 17, 1956 |
| 2,772,939 | Laico | Dec. 4, 1956 |

FOREIGN PATENTS

| | | |
|---|---|---|
| 450,464 | Great Britain | July 17, 1936 |